(12) United States Patent
Choo

(10) Patent No.: US 6,243,335 B1
(45) Date of Patent: Jun. 5, 2001

(54) TRACKING SERVO CONTROL METHOD AND DEVICE FOR PREVENTING TREMBLE OF OBJECT LENS DURING FAST SEARCH

(75) Inventor: Chang-Yeob Choo, Yongin-shi (KR)

(73) Assignee: Samsung Electronics Co., LTD, Suwon (KR)

(*) Notice: Subject to any disclaimer, the term of this patent is extended or adjusted under 35 U.S.C. 154(b) by 0 days.

(21) Appl. No.: 09/196,109

(22) Filed: Nov. 20, 1998

(30) Foreign Application Priority Data

Nov. 22, 1997 (KR) .................................................. 97/62132

(51) Int. Cl.[7] ....................................................... G11B 7/09
(52) U.S. Cl. .................................... 369/44.28; 369/44.29; 369/44.35
(58) Field of Search .............................. 369/44.27, 44.28, 369/44.29, 44.32, 44.34, 44.35, 44.41, 47, 48, 59, 112

(56) References Cited

U.S. PATENT DOCUMENTS 4,775,967 * 10/1988 Shimada et al. .................. 369/112 X
5,684,371 * 11/1997 Tarui et al. ........................... 318/254

* cited by examiner

Primary Examiner—Muhammad Edun
(74) Attorney, Agent, or Firm—Staas & Halsey LLP

(57) ABSTRACT

A tracking servo control method for preventing a tremble of an object lens installed in a pickup in an optical disk drive. A determination is made whether a distance between a target track and a current track where the pickup is presently placed is longer than a first distance. When the distance between the target track and the current track is longer than the first distance, both ends of a tracking coil through which a driving current for moving the object lens flows, are shorted. In the meantime, when the distance between the target track and the current track is shorter than a second distance as the pickup moves to the target track, both ends of the tracking coil are opened. The first distance is equivalent to a distance of 1000 tracks, and the second distance is equivalent to a distance of 100–200 tracks.

25 Claims, 4 Drawing Sheets

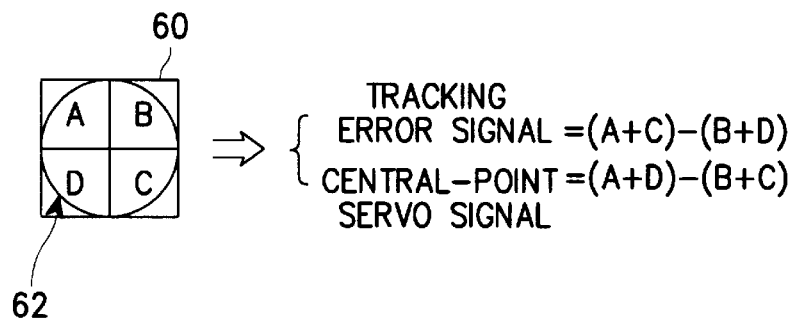
FIG. 3
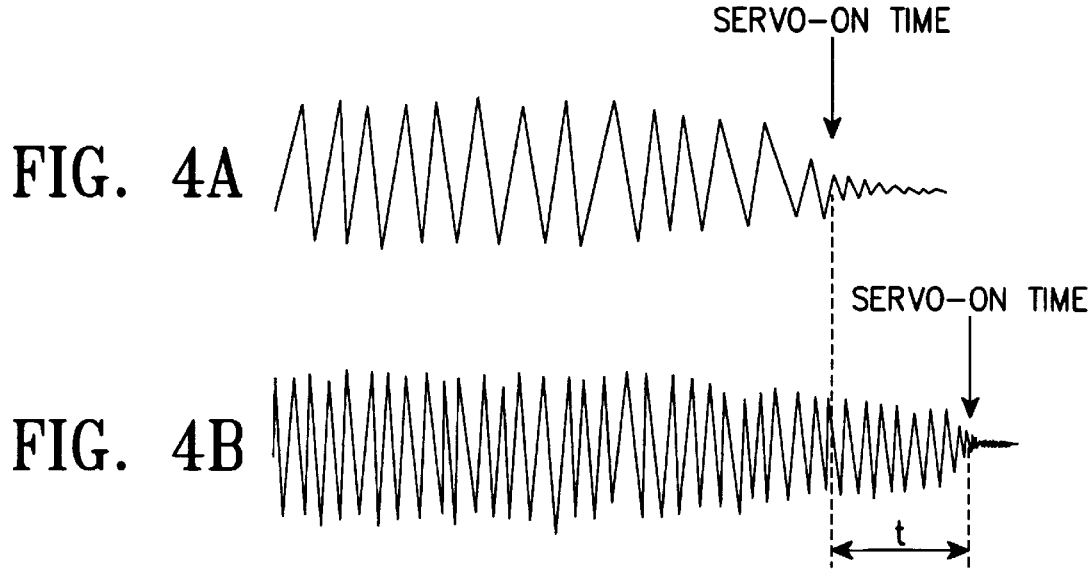
FIG. 4A
FIG. 4B

TRACKING SERVO CONTROL METHOD AND DEVICE FOR PREVENTING TREMBLE OF OBJECT LENS DURING FAST SEARCH

CROSS-REFERENCE TO RELATED APPLICATIONS

This application claims the benefit of Korean Application No. 62132/1997, filed Nov. 22, 1997, in the Korean Patent Office, the disclosure of which is incorporated herein by reference.

BACKGROUND OF THE INVENTION

1. Field of the Invention

The present invention relates to an optical disk drive, and in particular, to a tracking servo control method and device for preventing a tremble of an object lens during a fast search mode.

2. Description of the Related Art

Compact disks (CD), a kind of an optical disk, are typically used for recording audio data such as music. Recently, however, the CDs are widely used as an auxiliary storage for text and computer data because of its high storage capacity.

In general, the CDs have a large number of tracks arranged at fine intervals of 1.6 $\mu$m, wherein the number of the tracks is about twenty thousand for recording music of one hour. Therefore, in a microscopic view, the CDs may rotate acentrically. From the standpoint of an optical pickup, each track with a width of about 0.5 $\mu$m rotates (or proceeds) sinusoidally. A tracking servo allows the optical pickup to accurately search (or seek) the tracks and radiate a laser beam to them. A fundamental structure of the tracking servo is illustrated in FIG. 1.

In FIG. 1, reference numeral 2 denotes an optical disk (i.e., CD), reference numeral 4 denotes a disk motor, and reference numeral 6 denotes a pickup. As illustrated, the pickup 6 includes an object lens 30, a tracking coil 32, a magnet 34, a ¼-wavelength plate 36, a beam splitter 38, an optical detector 40 and a laser diode 42. Further, reference numeral 8 denotes a feeding motor for feeding the pickup 6, reference numeral 10 denotes a tracking error detector 10, reference numeral 12 denotes a phase compensator, reference numeral 14 denotes a system controller, and reference numerals 16 and 22 denote adders. Moreover, reference numerals 18 and 24 denote drivers, and reference numeral 20 denotes a lowpass filter (LPF).

In operation, the tracking error detector 10 generates a tracking error signal according to a beam trace status, and the phase compensator 12 generates a phase compensation signal according to the tracking error signal. The tracking servo corrects the position of a laser beam spot by moving the object lens 30 and the pickup body 6 in any direction according to the phase compensation signal. After tracking, the pickup 6 follows a specific track. For moving the pickup 6, the adder 22 adds a search control signal output from the system controller 14 to an output signal of the lowpass filter 20 which lowpass-filters the phase compensation signal output from the phase compensator 12. The driver 24 then drives the feeding motor 8 according to an output signal of the adder 22, to move the pickup 6 in any direction. Further, for moving the object lens 30, the adder 16 adds the search control signal output from the system controller 14 to the phase compensation signal output from the phase compensator 12, and the driver 18 drives an actuator (comprising the tracking coil 32 and the magnet 34) according to an output signal of the adder 16, to move the object lens 30.

FIG. 2 illustrates a schematic block diagram of a conventional tracking servo control device for preventing a tremble of the object lens during a fast search (or course seek) mode. Referring to FIG. 2, a switch 54 has a common node connected to the input of the adder 16, a contact node A connected to an output of the phase compensator 12 and a contact node B connected to an output of an amplifier 52. In the conventional tracking servo control device, the pickup 6 outputs a central-point servo signal for positioning the object lens 30 at a stable central point, to prevent a tremble of the object lens 30 during the fast search. The central-point servo signal is amplified in the amplifier 52 and then applied to the contact node B of the switch 54. The phase compensator 12 outputs the phase compensation signal according to the tracking error signal from the tracking error detector 10 and provides the phase compensation signal to the contact node A of the switch 54.

FIG. 3 illustrates a diagram for explaining the tracking error signal and the central-point servo signal, in a heterodyne tracking servo. In FIG. 3, reference numeral 60 denotes a photodiode divided into A, B, C and D areas, and reference numeral 62 denotes an optical spot. The tracking error signal output from the tracking error detector 10 has a value of (A+C)−(B+D), and the central-point servo signal output from the pickup 6 has a value of (A+D)−(B+C). As can be appreciated, the central-point servo signal and the tracking error signal have opposite phases relative to each other.

FIG. 4A illustrates a frequency and a servo-on time of the tracking error signal in the state where the object lens 30 does not tremble during slow search (or fine seek), and FIG. 4B illustrates a frequency and a servo-on time of the tracking error signal in the state where the object lens 30 trembles during the fast search (or course seek). As illustrated, the servo-on time during the fast search of FIG. 4B is delayed by a time t as compared with the servo-on time during the slow search of FIG. 4A. Accordingly, track searching is delayed by the time t.

To prevent the delay in searching the tracks, the system controller 14 switches the common node of the switch 54 to the contact node B slightly before the servo-on time. The adder 16 then adds the search control signal to the central-point servo signal output from the amplifier 52 instead of the phase compensation signal output from the phase compensator 12. As a result, the driver 18 provides the tracking coil 32 with a driving current corresponding to the central-point servo signal. The central-point servo signal having the phase opposite to the phase of the tracking error signal, stabilizes the object lens 30 which was trembling by a driving current corresponding to a tracking signal.

However, the conventional tracking servo control device is disadvantageous in that it cannot use a pickup which does not output the central-point servo signal. Further, although the pickup outputs the central-point servo signal, the central-point servo signal, the central-point servo signal itself may have a deviation, which makes it difficult to accurately stabilize the trembling object lens.

SUMMARY OF THE INVENTION

It is therefore an object of the present invention to provide a tracking servo control method and device for preventing a tremble of an object lens during a fast search mode without regard to a type of a pickup used to read information from a compact disk.

It is another object of the present invention to provide a tracking servo control method and device for preventing a tremble of an object lens during a fast search mode without using a central-point servo signal.

Additional objects and advantages of the invention will be set forth in part in the description which follows and, in part, will be obvious from the description, or may be learned by practice of the invention.

To achieve the above and other objects of the present invention, there is provided a tracking servo control method of preventing a tremble of an object lens installed in a pickup in an optical disk drive. In the method, it is determined whether a distance between a target track and a current track where the pickup is presently placed is longer than a first distance. When the distance between the target track and the current track is longer than the first distance, both ends of a tracking coil through which a driving current for moving the object lens flows, are shorted. In the meantime, when the distance between the target track and the current track is shorter than a second distance as the pickup moves to the target track, both ends of the tracking coil are opened. Here, the first distance is equivalent to a distance of 1000 tracks, and the second distance is equivalent to a distance of 100–200 tracks.

BRIEF DESCRIPTION OF THE DRAWINGS

The above and other objects, features and advantages of the present invention will become more apparent from the following detailed description when taken in conjunction with the accompanying drawings in which like reference numerals indicate like parts. In the drawings:

FIG. 3 is a diagram for explaining a tracking error signal and a central-point servo signal of FIG. 2;

FIG. 4A is a diagram illustrating a frequency and a servo-on time of the tracking error signal of FIG. 2 in the state where the object lens does not tremble during a slow search mode;

FIG. 4B is a diagram illustrating a frequency and a servo-on time of the tracking error signal of FIG. 2 in the state where the object lens trembles during the fast search mode.

DESCRIPTION OF THE PREFERRED EMBODIMENT

A preferred embodiment of the present invention will be described hereinbelow with reference to the accompanying drawings. In the following description, well known functions or constructions are not described in detail sine they would obscure the invention in unnecessary detail.

Figure 1:
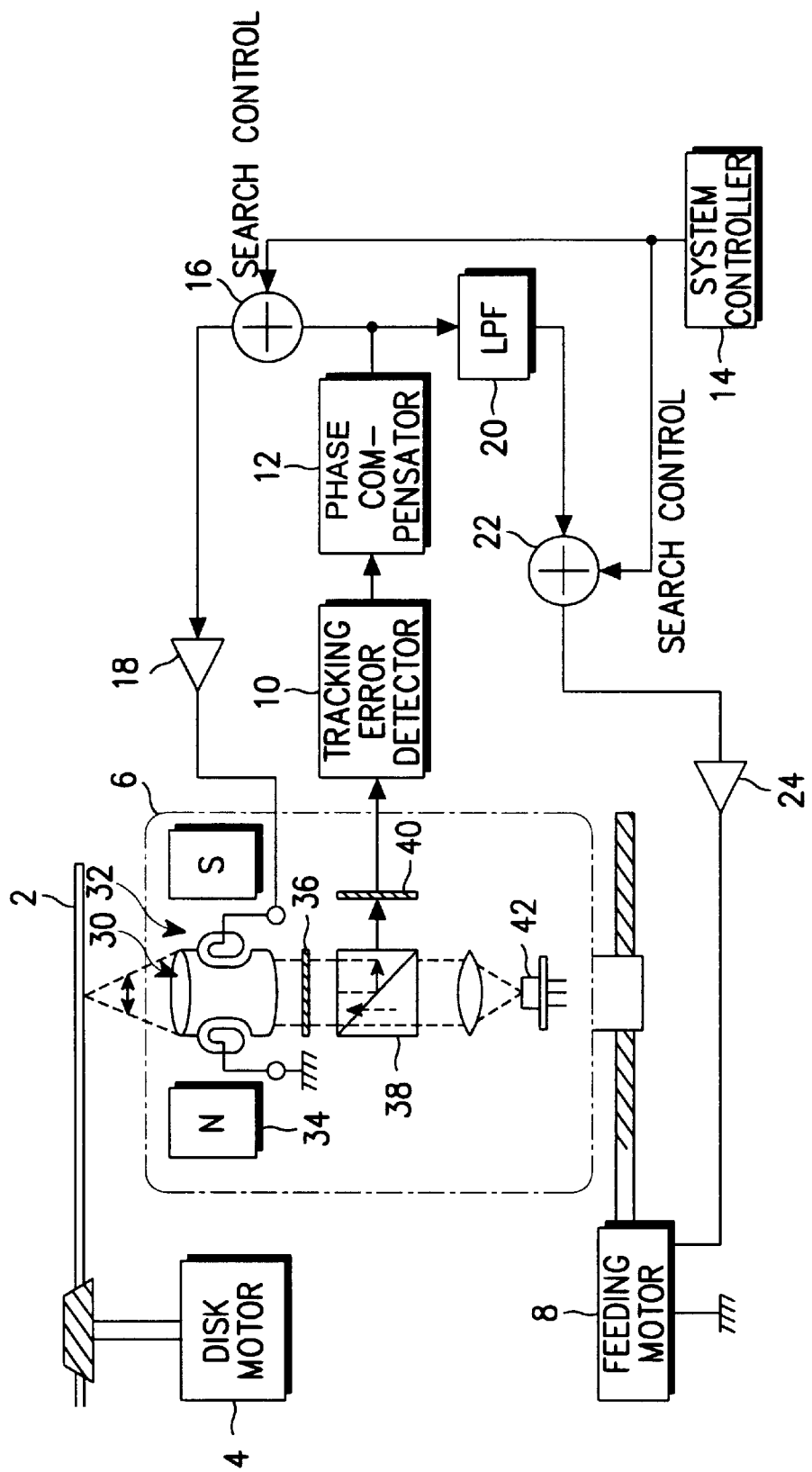
FIG. 1 is a schematic diagram illustrating a structure of a common tracking servo in an optical disk drive.
Figure 2:
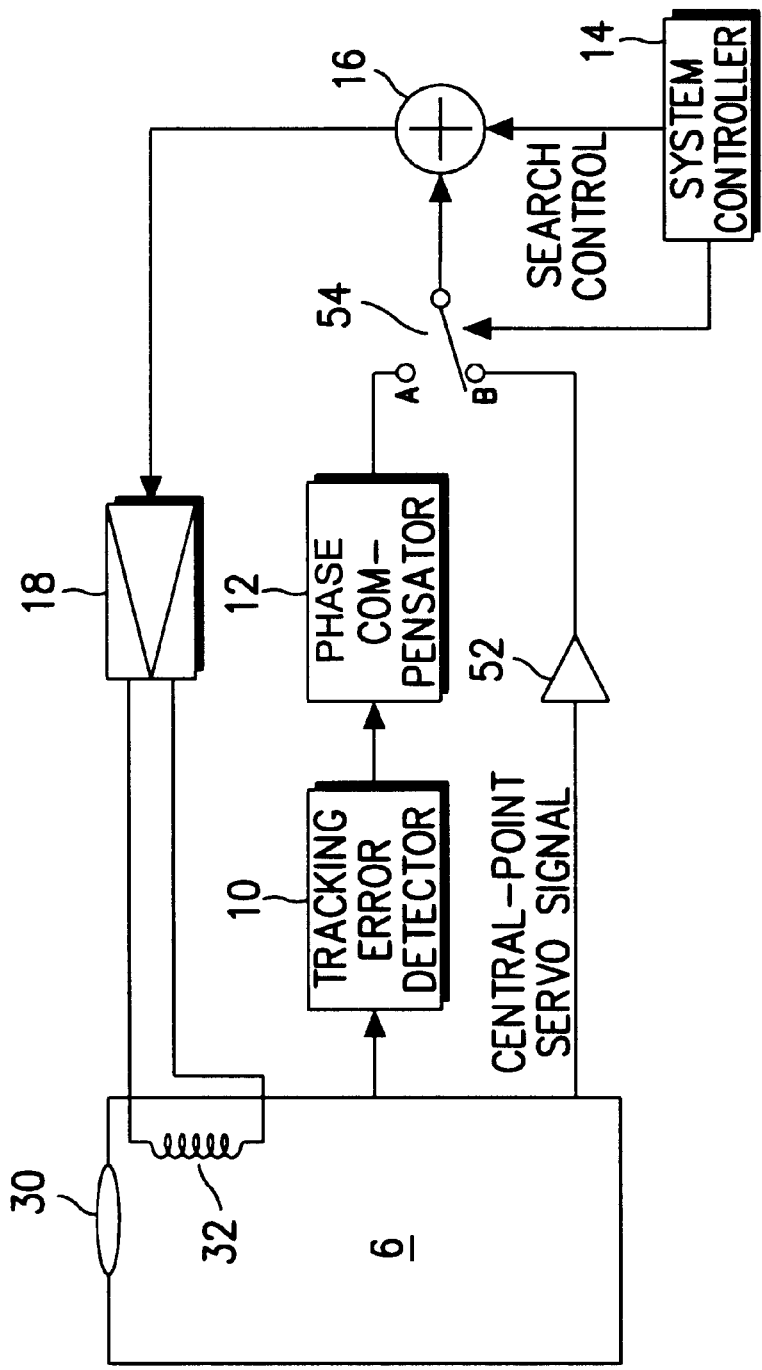
FIG. 2 is a schematic block diagram of a conventional tracking servo control device for preventing a tremble of an object lens during a fast search mode.
Figure 5:
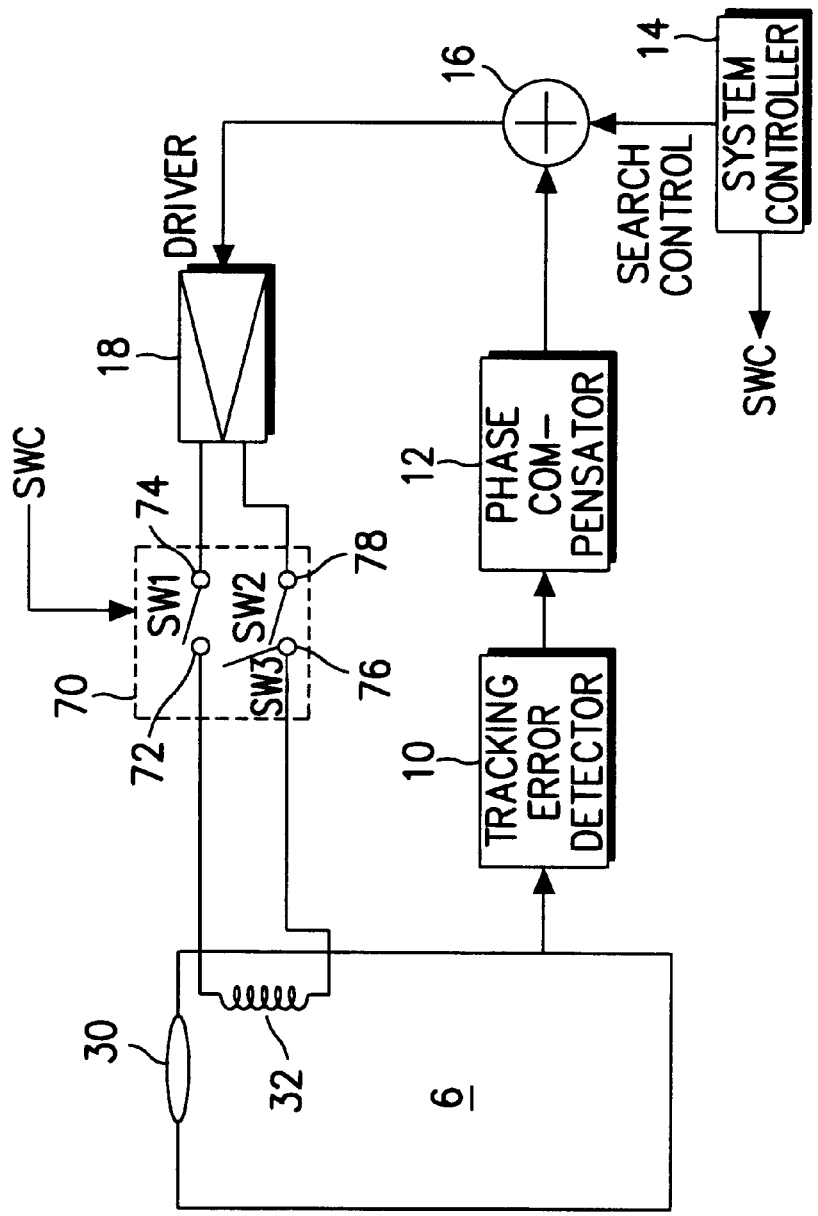
FIG. 5 is a schematic block diagram of a tracking servo control device for preventing a tremble of the object lens during the fast search mode according to an embodiment of the present invention.

FIG. 5 illustrates a tracking servo control device for preventing a tremble of the object lens during a fast search mode according to an embodiment of the present invention. Many of the elements shown in FIG. 5 are the same as the ones shown in FIG. 1. However, referring to FIG. 5, the tracking servo control device has a switch device 70 connected between the driver 18 and the tracking coil 32 through which a driving current flows to move the object lens 30. The switch device 70 includes a first switch SW1 connected between an end 72 of the tracking coil 32 and an output node 74 of the driver 18, a second switch SW2 connected between another end 76 of the tracking coil 32 and another output node 78 of the driver 18, and a third switch SW3 connected between both ends 72 and 76 of the tracking coil 32.

In operation, the system controller 14 performs the fast search when a target track is distanced by a predetermined number of tracks (e.g., 1000 tracks) or more, from the current track where the pickup 6 is presently placed; otherwise, the system controller 14 performs the slow search. During the fast search, the system controller 14 closes (turns on) the third switch SW3 and opens (turns off) the first and second switches SW1 and SW2, in response to a switching control signal SWC output from the system controller 14. Accordingly, both lens 72 and 76 of the tracking coil 32 for moving the object lens 30 are shorted together. In this circumstance, the actuator comprising the tracking coil 32 and the magnet 34 is inactivated, so that the object lens 30 may not tremble even during the fast search. In the meantime, the first and second switches SW1 and SW2 are opened with respect to the tracking coil 32 during the fast search to protect the driver 18.

In the meantime, when the current track gets near to the target track by a predetermined distance of 100–200 tracks as the pickup 6 moves toward the target track, the system controller 14 opens the third switch SW3 and closes the first and second switches SW1 and SW2. Then, the actuator (comprising the tracking coil 32 and the magnet 34) finely drives the object lens 30 to accurately position the object lens 30 at the target track. In effect, the slow search is performed at this time.

As described above, the tracking coil constituting the actuator is shorted during the fast search to prevent a tremble of the object lens 30.

While the invention has been shown and described with reference to a certain preferred embodiment thereof, it will be understood by those skilled in the art that various changes in form and details may be made therein without departing from the spirit and scope of the invention as defined by the appended claims.

What is claimed:

1. A tracking servo control method of preventing a tremble of an object lens installed in a pickup in an optical disk drive, comprising:

determining whether a distance between a target track and a current track where the pickup is presently placed is longer than a first distance;

shorting both ends of a tracking coil through which a driving current for moving the object lens flows, in response to the distance between the target track and the current track being longer than the first distance; and opening said both ends of the tracking coil, in response to the distance between the target track and the current track being shorter than a second distance as the pickup moves to the target track.

2. The tracking servo control method as claimed in claim 1, wherein:

the shorting comprises isolating the tracking coil from a driver for providing the driving current; and the opening comprises connecting the tracking coil to the driver.

3. The tracking servo control method as claimed in claim 1, wherein the first distance is equivalent to a distance of approximately 1000 tracks.

4. The tracking servo control method as claimed in claim 3, wherein the second distance is equivalent to a distance of approximately 100–200 tracks.

5. The tracking servo control method as claimed in claim 1, wherein the second distance is equivalent to a distance of approximately 100–200 tracks.

6. The tracking servo control method as claimed in claim 1, further comprising the steps of:
   determining a track error signal according to an output of the pickup;
   generating a phase compensation signal according to the tracking error signal;
   adding a search control signal to the phase compensation signal, to generate an added signal;
   applying the added signal to a driver, to generate the driving current; and
   applying the driving current to the tracking coil while said both ends of the tracking coil are open, in response to the distance between the target track and the current track being shorter than the second distance.

7. The tracking servo control method as claimed in claim 6, further comprising the steps of:
   low pass filtering the phase compensation signal, to generate a filtered compensation signal;
   adding the search control signal to the filtered compensation signal, to generate another added signal;
   applying the another added signal to another driver, to generate a pickup driving current; and
   applying the pickup driving current to the pickup to drive the pickup.

8. The tracking servo control method as claimed in claim 1, further comprising the steps of:
   determining a track error signal according to an output of the pickup;
   generating a phase compensation signal according to the tracking error signal;
   low pass filtering the phase compensation signal, to generate a filtered compensation signal;
   adding a search control signal to the filtered compensation signal, to generate an added signal;
   applying the added signal to a driver, to generate a pickup driving current; and
   applying the pickup driving current to the pickup to drive the pickup.

9. A tracking servo control method of preventing a tremble of an object lens installed in a pickup in an optical disk drive, comprising:
   determining whether a distance between a target track and a current track where the pickup is presently placed is longer than a first distance; and
   shorting both ends of a tracking coil through which a driving current for moving the object lens flows, in response to the distance between the target track and the current track being longer than the first distance.

10. A tracking servo control method of preventing a tremble of an object lens installed in a pickup in an optical disk drive, comprising:
   determining whether a distance between a target track and a current track where the pickup is presently placed is longer than a first distance; and
   isolating a tracking coil for moving the object lens from a driving current for moving the object lens, in response to the distance between the target track and the current track being longer than the first distance.

11. A tracking servo control device comprising:
   a pickup;
   an object lens installed in the pickup;
   a tracking coil, having first and second ends, to move the object lens according to a driving current applied thereto;
   a driver to provide the tracking coil with the driving current;
   a switch device that shorts the first and second ends of the tracking coil and isolates the driver from the tracking coil in response to a switching control signal; and
   a controller that generates the switch control signal.

12. The tracking servo control device as claimed in claim 11, wherein:
   the driver has first and second output nodes; and
   said switch device comprises
      a first switch selectively connected between the first end of the tracking coil and the first output node of the driver,
      a second switch selectively connected between the second end of the tracking coil and the second output node of the driver, and
      a third switch selectively connected between the first and second ends of the tracking coil.

13. The tracking servo control device as claimed in claim 12, further comprising:
   a tracking error detector to determine a track error signal according to an output of the pickup;
   a phase compensator to generate a phase compensation signal according to the tracking error signal;
   a system controller to generate a search control signal; and
   an adder to add the search control signal to the phase compensation signal, to generate an added signal;
   wherein the driver generates the driving current in accordance with the added signal.

14. The tracking servo control device as claimed in claim 13, further comprising:
   a low pass filter to low pass filter the phase compensation signal, to generate a filtered compensation signal;
   another adder to add the search control signal to the filtered compensation signal, to generate another added signal; and
   another driver which generates a pickup driving current to drive the pickup in accordance with the another added signal.

15. The tracking servo control device as claimed in claim 11, wherein:
   during the fast search, which occurs in response to the pickup being at a current track greater than a first distance from a target track, the first switch is open so that the first end of the tracking coil and the first output node of the driver are not connected, the second switch is open so that the second end of the tracking coil and the second output node of the driver are not connected, and the third switch is closed so as to connect the first and second ends of the tracking coil; and
   in response to the object lens being less than a second distance from the target track, the first switch is closed so as to connect the first end of the tracking coil and the first output node of the driver, the second switch is closed so as to connect the second end of the tracking coil and the second output node of the driver, and the third switch is open as that the first and second ends of the tracking coil are not connected.

16. The tracking servo control device as claimed in claim 15, wherein the first distance is equivalent to approximately 1000 tracks and the second distance is approximately 100–200 tracks.

17. The tracking servo control device as claimed in claim 15, further comprising:
   a tracking error detector to determine a track error signal according to an output of the pickup;
   a phase compensator to generate a phase compensation signal according to the tracking error signal;
   a system controller to generate a search control signal; and
   an adder to add the search control signal to the phase compensation signal, to generate an added signal;
   wherein the driver generates the driving current in accordance with the added signal.

18. The tracking servo control device as claimed in claim 11, wherein the switch device connects the first and second ends of the tracking coil to the driver to receive the driving current, and opens the first and second ends of the tracking coil relative to each other, to perform a slow search slower than the fast search, in response to the pickup being at a current track closer than a set distance from a target track.

19. The tracking servo control device as claimed in claim 18, wherein the first distance is equivalent to approximately 1000 tracks and the second distance is approximately 100–200 tracks.

20. The tracking servo control device as claimed in claim 11, further comprising:
   a tracking error detector to determine a track error signal according to an output of the pickup;
   a phase compensator to generate a phase compensation signal according to the tracking error signal;
   a system controller to generate a search control signal; and
   an adder to add the search control signal to the phase compensation signal, to generate an added signal;
   wherein the driver generates the driving current in accordance with the added signal.

21. A tracking servo control device for moving a pickup having an objective lens from a current track to a target track, comprising:
   an actuator, including a tracking coil, to drive the objective lens based upon a drive current;
   a drive unit to generate the drive current based upon an output of the pickup; and
   a switching element to isolate the drive unit from the tracking coil in response to the current track being at least a first distance from the target track, and to connect the drive unit to the tracking coil in response to the current track being less than a second distance from target track.

22. The tracking servo control device as claimed in claim 21, wherein:
   the tracking coil has first and second ends; and
   the switching element shorts the first and second ends in response to the current track being at least the first distance from the target track.

23. The tracking servo control device as claimed in claim 22, wherein:
   the driver has first and second output nodes; and
   the switching element comprises
      a first switch selectively connected between the first end of the tracking coil and the first output node of the driver,
      a second switch selectively connected between the second end of the tracking coil and the second output node of the driver, and
      a third switch selectively connected between the first and second ends of the tracking coil.

24. The tracking servo control device as claimed in claim 23, wherein:
   in response to the current track being at least as great as the first distance, the first switch is open so that the first end of the tracking coil and the first output node of the driver are not connected, the second switch is open so that the second end of the tracking coil and the second output node of the driver are not connected, and the third switch is closed so as to connect the first and second ends of the tracking coil; and
   in response to the current track being less than the second distance from the target track, the first switch is closed so as to connect the first end of the tracking coil and the first output node of the driver, the second switch is closed so as to connect the second end of the tracking coil and the second output node of the driver, and the third switch is open as that the first and second ends of the tracking coil are not connected.

25. A tracking servo control device for moving a pickup having an objective lens from a current track to a target track, comprising:
   an actuator, including a tracking coil having first and second ends, to drive the objective lens based upon a drive current;
   a drive unit to generate the drive current based upon an output of the pickup; and
   a switching element to short the first and second ends of the tracking coil in response to the current track being at least a first distance from the target track, and to open the first and second ends of the tracking coil the tracking coil relative to each other in response to the current track being less than a second distance from the target track.

* * * * *

UNITED STATES PATENT AND TRADEMARK OFFICE
CERTIFICATE OF CORRECTION

PATENT NO.      : 6,243,335 B1
DATED           : June 5, 2001
INVENTOR(S)     : Chang-Yeob-Choo It is certified that error appears in the above-identified patent and that said Letters Patent is hereby corrected as shown below:

<u>Column 7,</u>
Line 54, after "from" insert -- the --.

Signed and Sealed this

Twenty-sixth Day of February, 2002

Attest:

JAMES E. ROGAN
*Attesting Officer*     *Director of the United States Patent and Trademark Office*